(12) United States Patent
Onda

(10) Patent No.: US 11,913,422 B2
(45) Date of Patent: Feb. 27, 2024

(54) WAVE FORCE UTILIZATION UNIT AND WAVE FORCE UTILIZATION SYSTEM USING SAME

(71) Applicant: Ginjirou Onda, Tokyo (JP)

(72) Inventor: Ginjirou Onda, Tokyo (JP)

( * ) Notice: Subject to any disclaimer, the term of this patent is extended or adjusted under 35 U.S.C. 154(b) by 176 days.

(21) Appl. No.: 17/475,393

(22) Filed: Sep. 15, 2021

(65) Prior Publication Data

US 2022/0082075 A1    Mar. 17, 2022

(30) Foreign Application Priority Data

Sep. 16, 2020 (JP) ................. 2020-155607

(51) Int. Cl.
    *F03B 13/14* (2006.01)
(52) U.S. Cl.
    CPC .................. *F03B 13/148* (2013.01)
(58) Field of Classification Search
    CPC .................................. F03B 13/148
    See application file for complete search history.

(56) References Cited

U.S. PATENT DOCUMENTS

| | | | | |
|---|---|---|---|---|
| 8,072,088 B2* | 12/2011 | McMinn | ............... | F03B 13/266 60/398 |
| 8,564,152 B1* | 10/2013 | Costas | ................... | F03B 13/22 60/497 |
| 10,233,894 B2* | 3/2019 | Pereira De Gouveia Lopes De Almeida | ............... | F03B 13/141 |
| 2011/0169265 A1* | 7/2011 | Chen | ....................... | F03B 13/16 290/53 |
| 2013/0221672 A1* | 8/2013 | Costas | .................... | F03B 13/16 290/53 |

FOREIGN PATENT DOCUMENTS

| | | | | | |
|---|---|---|---|---|---|
| FR | 2459379 A | * | 2/1981 | ............ | F03B 13/148 |
| JP | 3917858 A | | 7/2003 | | |
| WO | WO-03078831 A1 | * | 9/2003 | ............ | F03B 13/148 |
| WO | WO-2010122187 A1 | * | 10/2010 | ......... | B29C 45/4005 |

\* cited by examiner

Primary Examiner — Kayla Mccaffrey
(74) Attorney, Agent, or Firm — Schmeiser, Olsen & Watts, LLP

(57) ABSTRACT

Provided is a wave force utilization unit capable of further reducing product cost and installation cost and effectively utilizing a wave force while decreasing the wave force, and a wave force utilization system in which the unit is used. The wave force utilization unit includes a box-shaped floating unit 1 supported via a support to move in an up-down direction, in response to movement of the sea surface in the up-down direction. The floating unit 1 includes a main body 2, an introduction part 3 disposed continuously on one side of the main body 2, and a water drain part 4 disposed continuously on the other side of the main body 2, the main body 2 includes an air chamber 5 that is a sealed space and acts to float up the floating unit 1, and a flow-through chamber 6 through which seawater flows from the introduction part 3 to the water drain part 4.

14 Claims, 4 Drawing Sheets

WAVE FORCE UTILIZATION UNIT AND WAVE FORCE UTILIZATION SYSTEM USING SAME

CROSS-REFERENCE TO RELATED APPLICATIONS

This application claims priority to Japanese Application No. 2020-155607, having a filing date of Sep. 16, 2020, the entire contents of which are hereby incorporated by reference.

FIELD OF TECHNOLOGY

The following relates to a wave force utilization unit and a wave force utilization system in which the unit is used, and more particularly to a wave force utilization unit installed mainly in a shallow place with waves in the sea to effectively utilize wave force energy while decreasing a wave force and a wave force utilization system in which the unit is used.

BACKGROUND

Energy of sea waves is enormous and infinite, and hence various attempts to effectively utilize the energy have been made, and there are successful examples, but most of the examples require large-scale equipment and involves high cost, and hence there are restrictions on spread of the effective utilization. To solve the problem, the present inventor has proposed a wave force utilization system that has a simple and small-scale configuration and is comparatively easily installable in shallow shore and capable of effectively utilizing enormous and infinite wave energy in power generation, sea bottom cleaning or the like (Japanese Patent No. 3917858).

The proposed wave force utilization system includes: a wave force collection part including an opening extending in a length direction and disposed to be opposed to waves, a cylinder body installed in an inclined state in a wave progress direction, and rectification plates arranged in parallel to convert seawater flowing into the cylinder body through the opening into in-cylinder water flow to guide the flow to one end portion, and wave force utilization means installed in the one end portion of the wave force collection part.

SUMMARY

The proposed wave force utilization system exerts expected effects and achieves results, but this system also involves cost for a wave force collection part itself including a fixing pile and for an installation work of the part. The cost is not as much as cost for a conventional large-scale system, but is considerably high, and hence emergence of a wave force utilization system that further reduces cost has been demanded. Embodiments of the present invention have been made to meet such requirements, and an aspect thereof is to provide a wave force utilization unit capable of further reducing product cost and installation cost and additionally, effectively utilizing a wave force while decreasing the wave force, and a wave force utilization system in which the unit is used.

The embodiments of the invention solve the aforementioned problem is a wave force utilization unit including a box-shaped floating unit supported via support means on the surface of the sea to move in an up-down direction, in response to movement of the sea surface in the up-down direction, the floating unit includes a main body, an introduction part disposed continuously on one side of the main body, and a water drain part disposed continuously on the other side of the main body, the main body includes an air chamber that is a sealed space and acts to float up the floating unit, and a flow-through chamber through which seawater flows from the introduction part to the water drain part, the flow-through chamber includes an introduction door that opens only in an indoor direction on the introduction part side, and a water drain door that opens only in an outdoor direction on the water drain part side, and the introduction part includes a plurality of rectification plates installed to be inclined to a side surface of the main body for introducing seawater into the flow-through chamber.

In one embodiment, a plurality of flow-through chambers and a plurality of air chambers are provided and alternately arranged. Also, a sand removing square pipe extending from each flow-through chamber to a rear surface of the water drain part is installed on a bottom of the water drain part, and a sand removing door is installed in an end face of the water drain part on an outflow side.

A buoyancy adjustment mechanism is disposed in each air chamber. Also, a wave receiving plate extending diagonally upward from a top edge of the introduction part is disposed.

In one embodiment, a garbage and seaweed collection fence installed in a wave receiving port of the introduction part to entangle garbage and seaweed, and an entry prevention fence for fish and shellfish installed in an end portion of the water drain part on an outflow side are further provided.

In one embodiment, a power generation device is disposed on an upper surface of the main body, and a U-shaped pipe extending from the water drain part is connected to the power generation device. The U-shaped pipe includes a water pressure adjustment valve disposed to act to promote discharge of sediment from the sand removing square pipe and the sand removing door. Furthermore, the U-shaped pipe includes an intake port of compressed air.

In one embodiment, an air reservoir plate is perpendicularly disposed on an inner top surface of the introduction part for allowing air to remain in an upper portion of the introduction part.

In one embodiment, the support means includes a plurality of support poles vertically arranged in the sea to be inserted into a plurality of respective slide support pipes, the slide support pipes being formed to extend through the floating unit and protrude above and below. In another embodiment, the support means includes anchor blocks fixed to a plurality of respective portions of the floating unit via mooring elements.

Further embodiments solve the aforementioned problem is a wave force utilization system including a plurality of wave force utilization units, and wave force utilization means installed in one main flow pipe for utilizing water flow energy of seawater flow collected in the main flow pipe, the main flow pipe being connected to branch pipes extending from the water drain parts of the wave force utilization units.

With the aforementioned wave force utilization unit and the wave force utilization system in which the unit is used according to embodiments of the present invention, a wave force can be effectively utilized while decreasing the wave force, and additionally, product cost and installation cost can be reduced, which can effectively contribute to spread of the system.

BRIEF DESCRIPTION

Some of the embodiments will be described in detail, with reference to the following figures, wherein like designations denote like members, wherein.

DETAILED DESCRIPTION

Figure 1:
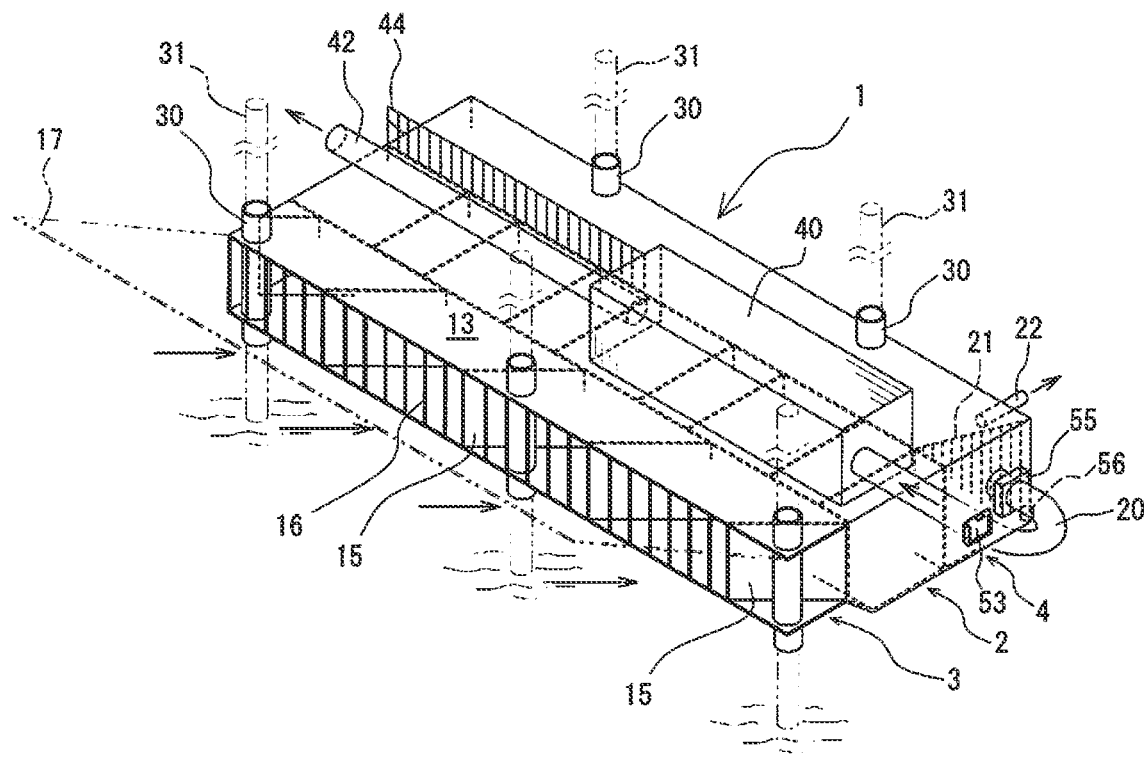
FIG. 1 is a perspective view of one embodiment of a wave force utilization unit according to embodiments of the present invention.

Embodiments for implementing the present invention will be described with reference to the accompanying drawings. A wave force utilization unit A according to embodiments of the present invention includes a box-shaped floating unit 1 supported via support means to move in an up-down direction, in response to movement of the surface of the sea in the up-down direction. The floating unit 1 has a buoyancy set so that a waterline is located at an intermediate position, that is, an upper part floats above the sea surface, and a lower part is located at a position to sink into the sea as described later.

The floating unit 1 includes a main body 2, an introduction part 3 disposed continuously on one side of the main body 2, and a water drain part 4 disposed continuously on the other side of the main body 2, and the main body 2, the introduction part 3 and the water drain part 4 have a top surface and a bottom surface that are a common top plate and a common bottom plate or that are integrally coupled surfaces.

The main body 2 includes an air chamber 5 that is a sealed space and functions to float up the floating unit 1, and a flow-through chamber 6 through which seawater flows from the introduction part 3 to the water drain part 4, and a plurality of air chambers and a plurality of flow-through chambers are alternately arranged. In this case, it is desirable that the air chambers 5 are located at both ends to take balance. Each air chamber 5 contains air in a sealed manner, and functions so that the whole floating unit 1 floats due to the buoyancy. For this purpose, the whole air chamber 5 has a volume designed to obtain the buoyancy sufficient for floating the whole floating unit 1, that is, the buoyancy to locate the waterline at the above position.

Figure 2:
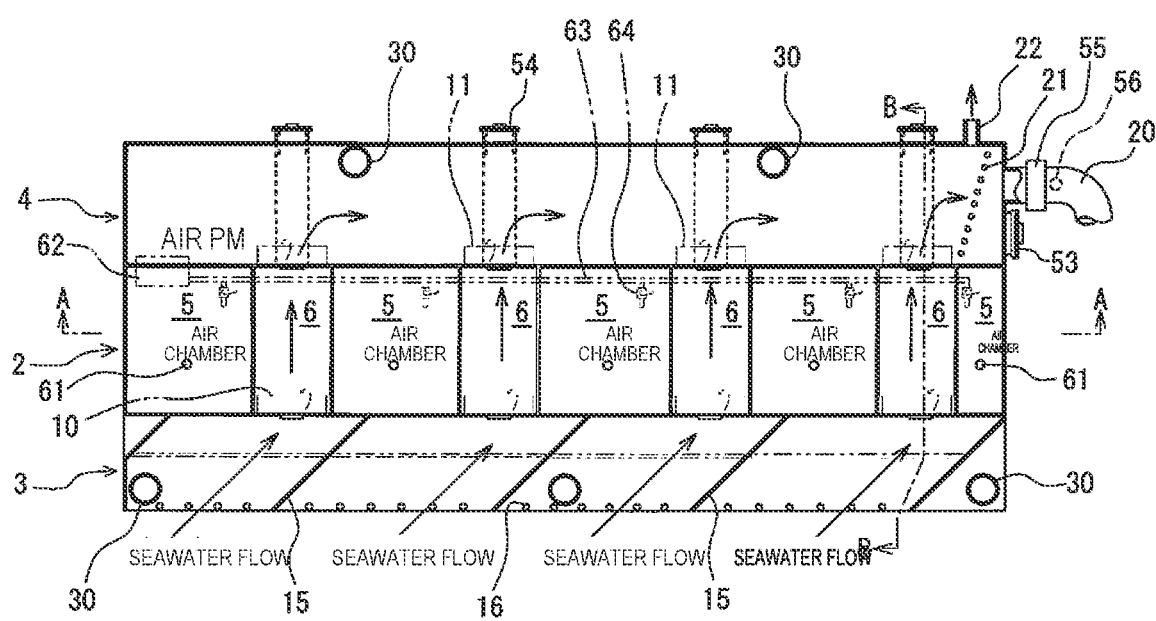
FIG. 2 is a cross-sectional view of the embodiment of the wave force utilization unit according to embodiments of the present invention.
Figure 3:
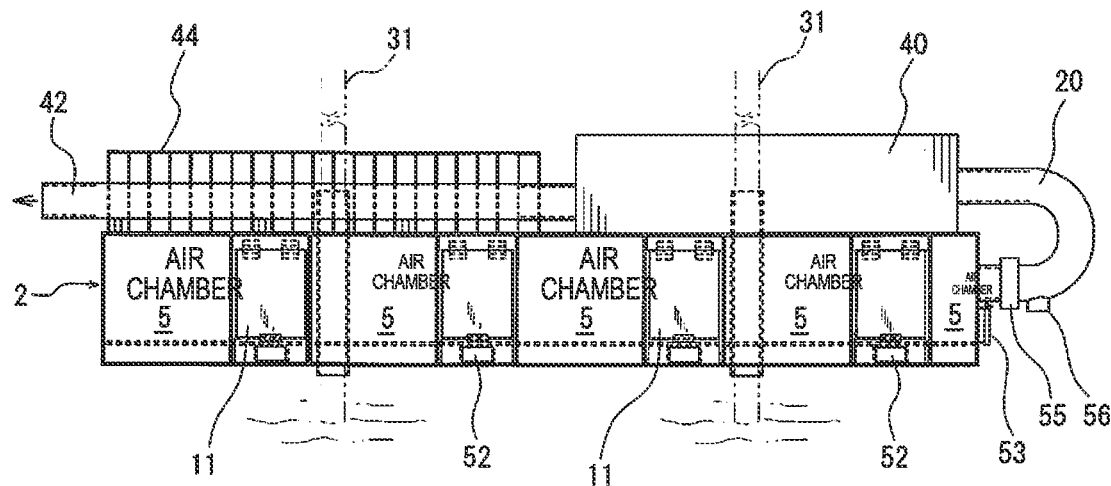
FIG. 3 is a cross-sectional view taken along the line A-A in FIG. 2.

In the embodiment, an exit and entry mechanism of ballast water is disposed in the air chamber 5 so that the buoyancy can be adjusted. For example, each air chamber 5 includes a seawater exit and entrance opening 61 through which seawater freely exits from and enters the air chamber, and a piping 63 that extends from an air pump 62 and to which a buoyancy adjusting air valve 64 is attached (see FIG. 2). The seawater freely flows through the seawater exit and entrance opening 61 into each air chamber 5, and hence seawater always flows up to a height of a waterline 60 in the air chamber 5. Therefore, when the air pump 62 is operated to increase a pressure in the air chambers 5, the seawater in the air chambers 5 is pushed out from the seawater exit and entrance openings 61 to lower a water level, and the floating unit 1 rises until the water level reaches a position of the waterline 60.

Each flow-through chamber 6 includes an introduction door 10 that opens only in an indoor direction on the introduction part 3 side, and a water drain door 11 that opens only in an outdoor direction on the water drain part 4 side. Therefore, seawater flowing into the introduction part 3 as described later pushes and opens the introduction door 10 to flow into the flow-through chamber 6 with a flow pressure, and then pushes and opens the water drain door 11 to flow out to the water drain part 4. Each of the introduction door 10 and the water drain door 11 is usually perpendicularly disposed and rotates by about 90 degrees via a hinge from a perpendicular state only in one direction. Note that in partition walls where the introduction door 10 and the water drain door 11 are installed, stoppers for preventing inversion of the introduction door 10 and the water drain door 11 are installed (see FIG. 4).

The introduction part 3 includes a plurality of rectification plates 15 installed between a top plate 13 and a bottom plate 14 to control a wave progress direction. The rectification plates 15 are installed to be inclined by about 45 degrees to a side plate of the main body 2. A garbage and seaweed collection fence 16 is installed in a front open surface of the introduction part 3, to entangle garbage and seaweed. Furthermore, in an edge portion of the top plate 13 of the introduction part 3, a wave receiving plate 17 extending to be upwardly inclined is disposed. The wave receiving plate 17 receives and directs waves into the introduction part 3 and is reinforced by a triangular reinforcing member 18 fixed to the top plate 13. An incoming wave hits this wave receiving plate 17, to decrease a momentum.

The water drain part 4 is a longitudinal box-shaped closed space having an opened side surface on a main body 2 side and being disposed continuously with the main body 2 and includes a U-shaped pipe 20 disposed on an end plate on an outflow side. Furthermore, an entry prevention fence 21 for preventing entry of fish into the U-shaped pipe 20 is installed to cover the vicinity of an inlet of the U-shaped pipe 20 in the water drain part 4, and a release port 22 for letting fish escape is disposed in front of the entry prevention fence 21. As described above, the water drain part 4 receives and collects seawater flowing from the respective flow-through chambers 6 to push and open the respective water drain doors 11 and flowing inside and supplies the seawater to after-mentioned wave force utilization means via the U-shaped pipe 20.

The support means that supports the floating unit 1 in the sea may include, for example, a plurality of support poles 31 vertically arranged in the sea. The support poles 31 are inserted into a plurality of respective slide support pipes 30 arranged to vertically extend through the introduction part 3 and the water drain part 4 of the floating unit 1 and to protrude above and below, to support free movement of the floating unit 1 in the up-down direction in response to change in sea surface. In an example shown in the drawing, the slide support pipes 30 are installed in three portions of the introduction part 3 and in two portions of the water drain part 4, and the floating unit 1 is configured to be supported with five support poles 31, but embodiments of the present invention are not limited to this example.

Figure 5:
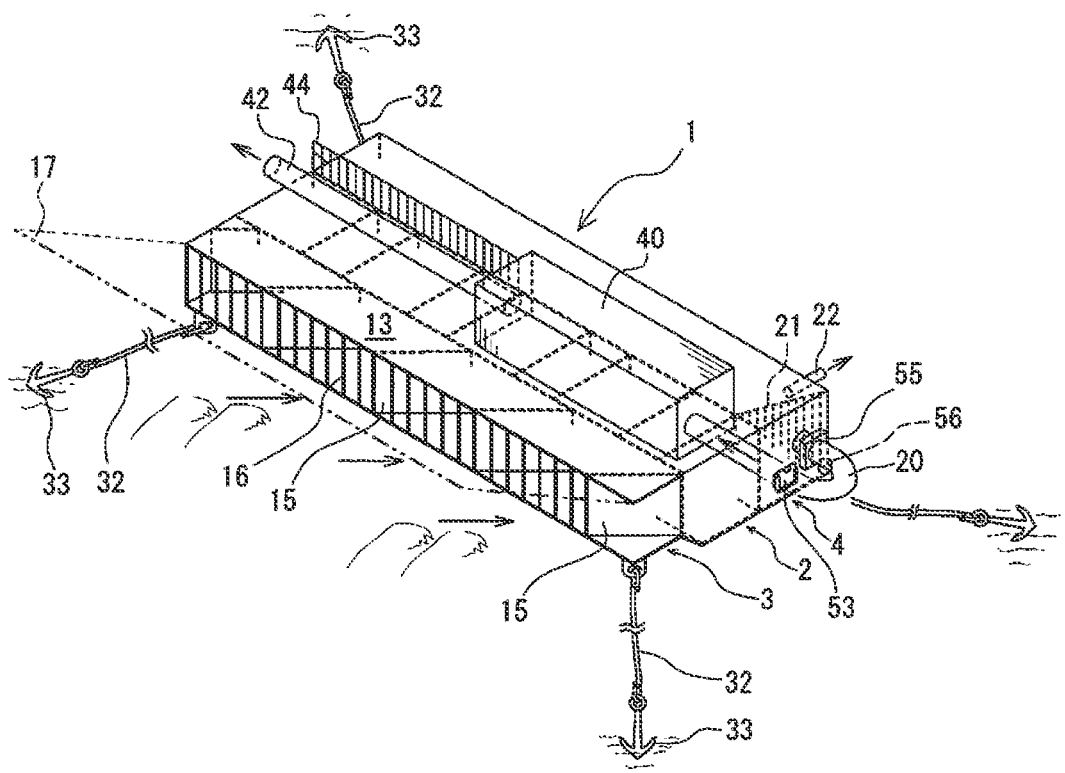
FIG. 5 is a perspective view of another embodiment of the wave force utilization unit according to embodiments of the present invention.

Another support means or support the floating unit 1 in the sea may include, for example, anchor blocks 33 fixed to a plurality of respective portions (e.g., four corners) of the floating unit 1 via mooring elements 32 (see FIG. 5). Each anchor block 33 may have an anchor shape, or may be a simple block, or may be placed on a sea bottom, or buried in the bottom. In a case of using the anchor block 33 as the support means, the floating unit 1 is swingable not only in the up-down direction but also in an arbitrary direction.

The wave force utilization means in the example shown in the drawing is a small power generation device 40 installed in an upper surface of the floating unit 1 (usually, an upper surface of the main body 2). The U-shaped pipe 20 extending from the water drain part 4 is connected to this power generation device 40, and seawater flow from the water drain part 4 is always introduced. A flow direction in the power generation device 40 is opposite to a flow direction in the water drain part 4. In the power generation device 40, this seawater flow rotates a propeller 41, and drives a power generator to generate power, and the power is supplied to land via an unshown electrical wire. The seawater passing through the power generation device 40 is released from a drainpipe 42 connected to an end face of the device that is opposite to a surface of the device to which the U-shaped pipe 20 is connected. Reference numeral 44 denotes a handrail for use by a worker who performs inspection, repair or the like.

The U-shaped pipe 20 includes an intake port 56 of compressed air from a compressor, to increase a supply fluid pressure to the power generation device 40 as required. The compressed air intake port 56 is disposed on a lower surface side of the U-shaped pipe 20. Thus, as the compressed air containing a lot of bubbles and supplied from the compressed air intake port 56 rises in the U-shaped pipe 20, seawater in the water drain part 4 is pulled to flow into the power generation device 40 at an increased flow velocity.

It is considered that another wave force utilization means is a seawater purification device. The seawater purification device is configured by extending an end portion of the U-shaped pipe 20, or by coupling a pipe to the end portion to direct a tip of the pipe toward the bottom of the sea. For example, this means supplies jet to a depression from which sand is mined, to prevent abnormal generation of planktons causing red tide or the like in the depression, or to a place in a fish farm, to prevent feed residue from being deposited in the place.

An embodiment includes means for discharging sediment or a discharger such as sand accumulating in the flow-through chamber 6 and the water drain part 4. In this embodiment, a sand removing square pipe 52 is disposed in a lower part of the partition wall in which the water drain door 11 is installed, between the flow-through chamber 6 and the water drain part 4, and a discharge door 53 for discharging sand is installed in a lower part of the end face of the water drain part 4 on which the U-shaped pipe 20 is mounted. This discharge door 53 is usually of an electric vertical opening and closing type. Also, at an opening end of the square pipe 52, an electric vertical opening and closing type of discharge door 54 is installed. During a sand removing work, a fluid pressure in the flow-through chamber 6 and the water drain part 4 is increased, to forcibly flush sand. For this purpose, the U-shaped pipe 20 includes a water pressure adjustment valve 55, and the valve is closed to increase the fluid pressure in the flow-through chamber 6 and the water drain part 4.

Figure 4:
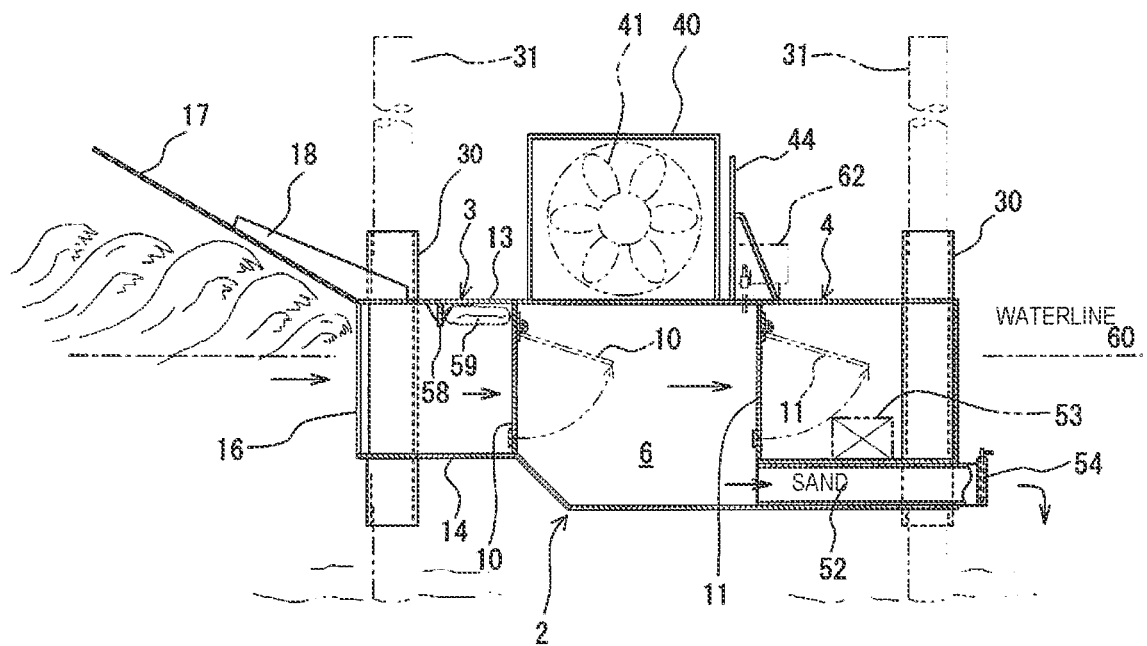
FIG. 4 is an enlarged cross-sectional view taken along the line B-B in FIG. 2.

Furthermore, when seawater once flowing into the flow-through chamber 6 draws, an air reservoir 59 can be formed in an upper portion of the introduction part 3 (see FIG. 4). For this purpose, an air reservoir plate 58 is perpendicularly disposed on a back surface of the top plate 13 of the introduction part 3. When waves draw, this air reservoir plate 58 acts to hold back part of air flowing from the introduction part 3 into the flow-through chamber 6 together with seawater, thereby forming the air reservoir 59 inside the air reservoir plate 58. The air that temporarily remains in this air reservoir 59 acts to increase an inflow pressure of seawater next coming to flow into the flow-through chamber 6, and simultaneously promotes discharge of sand accumulated on an inner bottom surface of the flow-through chamber 6, from the square pipe 52.

The wave force utilization unit including the above configuration according to embodiments of the present invention is installed via the above support means or support in a place of a shallow shore with waves so that the introduction part 3 is located on a sea side and inclined by about 45 degrees to a coastline, that is, so that the rectification plates 15 are oriented in the wave progress direction. The floating unit 1 floats due to the buoyancy of the air chamber 5, while swinging in response to the movement of the sea surface. A wave coming toward the floating unit 1 installed in this manner is guided by the rectification plates 15 and the wave receiving plate 17, so that a wave head flows into the introduction part 3, pushes and opens the introduction door 10 to flow into the flow-through chamber 6 of the main body 2 with the inflow pressure, and then pushes and opens the water drain door 11 to flow out to the water drain part 4 while keeping a momentum. The seawater flowing out to the water drain part 4 is sent to the power generation device 40 that is the wave force utilization means or wave force utilizer for effective utilization, while increasing the flow velocity in the U-shaped pipe 20 only including a small flow region.

In the seawater flowing into the introduction part 3, fish, seaweed, garbage and other various floating materials are mixed, but the seaweed and the like are caught and collected by the garbage and seaweed collection fence 16 in the entrance opening of the introduction part 3, and some of the materials that enter the introduction part 3 are discharged from the square pipe 52 and the discharge door 53 of the water drain part 4 together with sand. Also, fish entering the water drain part 4 are inhibited, by the entry prevention fence 21, from further entering the unit, and are released from the release port 22. Furthermore, in a case where a sand removing mechanism is disposed, the water pressure adjustment valve 55 is closed on a timely basis to increase the fluid pressure in the flow-through chamber 6 and the water drain part 4, and the discharge doors 53 and 54 are opened, to forcibly flush sand accumulated in the flow-through chamber 6 and the water drain part 4.

Figure 6:
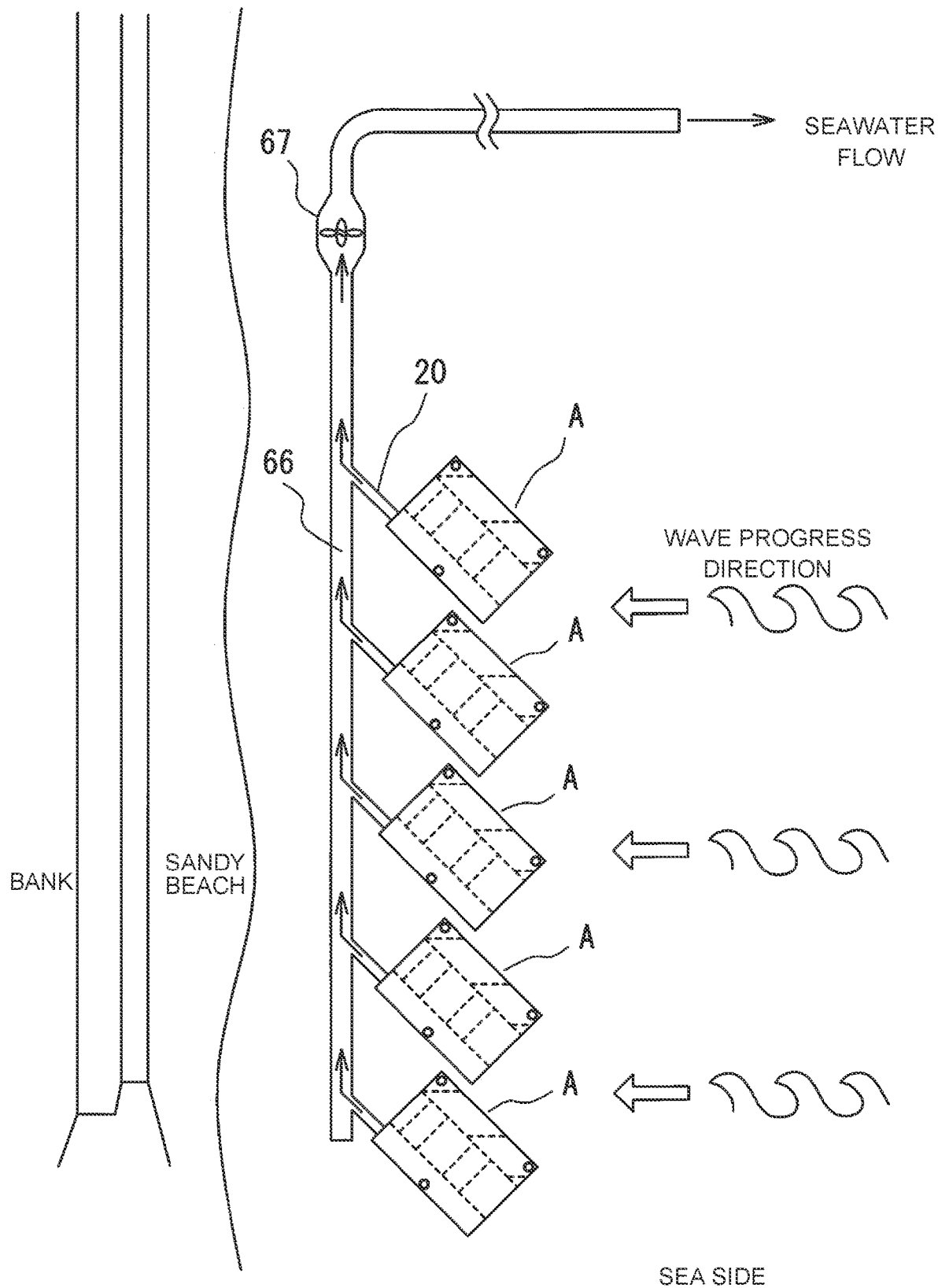
FIG. 6 is a plan view showing one embodiment of a wave force utilization system according to embodiments of the present invention.

The wave force utilization unit A according to embodiments of the present invention can be utilized alone, but a system in which a number of wave force utilization units are arranged at appropriate intervals is usually configured and utilized (see FIG. 6). In this case, U-shaped pipes 20 of respective wave force utilization units A may be connected together to one main flow pipe 66, and one wave force utilization means 67 may be installed in the main flow pipe 66.

As described above, the wave force utilization system according to embodiments of the present invention is installed, so that a wave absorbing effect and a sandy beach growing effect can be obtained together with a wave force utilization effect. That is, an incoming wave toward each wave force utilization unit A hits the wave force utilization unit A, part of the wave passes through the device to be dispersed and absorbed, or part of the wave is refracted at about 90 degrees to form a reflected wave. With the dispersion and absorption of the incoming wave, a stagnation region of drift sand is generated due to the wave absorption on a land side of the wave force utilization system, and the drift sand accumulates in the region, eventually to gradually grow a sandy beach.

Note that seawater hitting an inclined plane extending from a deep seabed to a shallow seabed forms a rising wave obliquely rising upward along the inclined plane. This rising wave from below hits a bottom surface of the floating unit 1 of the wave force utilization unit A, and hence the floating unit 1 receives this rising wave, moves in the up-down direction, becomes a resistance and acts to absorb the wave. Note that an incoming wave toward the land side is affected by this rising wave also to decrease the momentum.

INDUSTRIAL APPLICABILITY

According to embodiments of the present invention, a wave force utilization unit and a wave force utilization system in which the unit is used are provided as described above, so that it is possible to effectively utilize a wave force while decreasing the wave force, and it is simultaneously possible to promote sandy beach growth. Additionally, product cost and installation cost can be reduced, and hence industrial applicability of embodiments of the present invention is large.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A wave force utilization unit comprising a rectangular shaped floating unit supported via support means or a support on the surface of the sea to move in an up-down direction, in response to movement of the sea surface in the up-down direction, wherein the floating unit includes a main body, an introduction part disposed continuously on one side of the main body, and a water drain part disposed continuously on the other side of the main body, the main body includes a plurality of air chambers that are a sealed space and acts to float up the floating unit, and a plurality of flow-through chambers through which seawater flows from the introduction part to the water drain part, the flow-through chamber comprises an introduction door that opens only in an indoor direction on the introduction part side, and a water drain door that opens only in an outdoor direction on the water drain part side, and the introduction part comprises a plurality of rectification plates installed to be inclined to a side surface of the main body for introducing seawater into the flow-through chamber.

2. The wave force utilization unit according to claim 1, wherein the plurality of flow-through chambers and the plurality of air chambers are provided and alternately arranged.

3. The wave force utilization unit according to claim 1, further comprising:

a sand removing square pipe extending from each flow-through chamber of the plurality of flow-through chambers to a rear surface of the water drain part and being installed on a bottom of the water drain part, and a sand removing door installed in an end face of the water drain part on an outflow side.

4. The wave force utilization unit according to claim 1, further comprising:

a buoyancy adjustment mechanism disposed in each air chamber of the plurality of air chambers.

5. The wave force utilization unit according to claim 1, further comprising:

a garbage and seaweed collection fence installed in a wave receiving port of the introduction part, to entangle garbage and seaweed.

6. The wave force utilization unit according to claim 1, further comprising:

a wave receiving plate extending diagonally upward from a top edge of the introduction part.

7. The wave force utilization unit according to claim 1, further comprising:

an entry prevention fence for fish and shellfish installed in an end portion of the water drain part on an outflow side.

8. The wave force utilization unit according to claim 1, further comprising:

a power generation device disposed on an upper surface of the main body, wherein a U-shaped pipe extending from the water drain part is connected to the power generation device.

9. The wave force utilization unit according to claim 3, further comprising a power generation device disposed on an upper surface of the main body, wherein a U-shaped pipe extending from the water drain part is connected to the power generation device, and wherein the U-shaped pipe includes a water pressure adjustment valve disposed to act to promote discharge of sediment from the sand removing square pipe and the sand removing door.

10. The wave force utilization unit according to claim 8, wherein the U-shaped pipe includes an intake port of compressed air.

11. The wave force utilization unit according to claim 1, further comprising:

an air reservoir plate perpendicularly disposed on an inner top surface of the introduction part for allowing air to remain in an upper portion of the introduction part.

12. The wave force utilization unit according to claim 1, wherein the support means or the support comprises a plurality of support poles vertically arranged in the sea to be inserted into a plurality of respective slide support pipes, the slide support pipes being formed to extend through the floating unit and protrude above and below.

13. The wave force utilization unit according to claim 1, wherein the support means or the support comprises anchor blocks fixed to a plurality of respective portions of the floating unit via mooring elements.

14. A wave force utilization system comprising:

a plurality of wave force utilization units according to claim 1, and wave force utilization means or a wave force utilizer installed in one main flow pipe for utilizing water flow energy of seawater flow collected in the main flow pipe, the main flow pipe being connected to branch pipes extending from the water drain parts of the wave force utilization units.

* * * * *